(12) United States Patent
Nelms et al.

(10) Patent No.: US 9,571,511 B2
(45) Date of Patent: Feb. 14, 2017

(54) SYSTEMS AND METHODS FOR TRAFFIC CLASSIFICATION

(71) Applicant: DAMBALLA, INC., Atlanta, GA (US)

(72) Inventors: Terry Lee Nelms, Dallas, GA (US); Andrew Hobson, Atlanta, GA (US); Joseph Ward, Atlanta, GA (US)

(73) Assignee: Damballa, Inc., Atlanta, GA (US)

( * ) Notice: Subject to any disclaimer, the term of this patent is extended or adjusted under 35 U.S.C. 154(b) by 0 days.

(21) Appl. No.: 14/305,998

(22) Filed: Jun. 16, 2014

(65) Prior Publication Data

US 2014/0373148 A1 Dec. 18, 2014

Related U.S. Application Data

(60) Provisional application No. 61/835,358, filed on Jun. 14, 2013.

(51) Int. Cl.
*H04L 29/06* (2006.01)
(52) U.S. Cl.
CPC ....... *H04L 63/1425* (2013.01); *H04L 63/1441* (2013.01); *H04L 2463/144* (2013.01)
(58) Field of Classification Search
None
See application file for complete search history.

(56) References Cited

U.S. PATENT DOCUMENTS

| | | | |
|---|---|---|---|
| 8,418,249 B1* | 4/2013 | Nucci et al. | 726/23 |
| 2001/0014093 A1* | 8/2001 | Yoda et al. | 370/389 |
| 2002/0166063 A1* | 11/2002 | Lachman et al. | 713/200 |
| 2005/0086523 A1* | 4/2005 | Zimmer et al. | 713/201 |
| 2006/0150249 A1* | 7/2006 | Gassen et al. | 726/23 |
| 2007/0056038 A1* | 3/2007 | Lok | 726/23 |
| 2007/0209074 A1* | 9/2007 | Coffman | 726/23 |
| 2008/0178293 A1* | 7/2008 | Keen et al. | 726/23 |
| 2008/0222729 A1* | 9/2008 | Chen et al. | 726/24 |
| 2009/0138590 A1* | 5/2009 | Lee et al. | 709/224 |
| 2009/0265777 A1* | 10/2009 | Scott | 726/11 |
| 2010/0037314 A1* | 2/2010 | Perdisci et al. | 726/22 |
| 2011/0067106 A1* | 3/2011 | Evans et al. | 726/23 |
| 2011/0185423 A1* | 7/2011 | Sallam | 726/23 |
| 2014/0289854 A1* | 9/2014 | Mahvi | 726/23 |

* cited by examiner

*Primary Examiner* — Hadi Armouche
*Assistant Examiner* — Malcolm Cribbs
(74) *Attorney, Agent, or Firm* — Pepper Hamilton LLP (57) ABSTRACT

Systems and methods of classifying network traffic may monitor network traffic. Monitored traffic may be compared with a control protocol template (CPT). When a similarity between the monitored traffic and the CPT exceeds a match threshold, the monitored traffic may be associated with the CPT.

19 Claims, 10 Drawing Sheets

SYSTEMS AND METHODS FOR TRAFFIC CLASSIFICATION

CROSS-REFERENCE TO RELATED APPLICATIONS

This application claims the benefit of US Provisional Patent Application No. 61/835,358, filed Jun. 14, 2013, which is incorporated by reference in its entirety as if fully set forth herein.

DETAILED DESCRIPTION OF SEVERAL EMBODIMENTS

Malware, such as botnets, may include at least two fundamental components: a client agent, which may run on victim machines, and a control server application, which may be administered by the malware owner. Both components may employ code reuse, wherein new (polymorphic) malware releases may be created by simply re-packaging previous samples, or by augmenting previous versions with a few new functionalities. Moreover, it is not uncommon for the source code of successful malware to be sold or leaked on underground forums, and to be reused by other malware operators. Code reuse may result in in many different malware samples sharing a common command-and-control (C&C) protocol, although control server instances owned by different malware operators may run on different C&C domains and IPs. A C&C protocol may be the set of specifications implemented to enable the malware control application logic, which is defined at a higher level of abstraction compared to the underlying transport (e.g., TCP or UDP) or application (e.g., HTTP) protocols that facilitate the C&C communications.

Systems and methods described herein may mine new, previously unknown C&C domain names from live enterprise network traffic. Starting from a seed list of known C&C communications and related domain names found in malware-generated network traces, new C&C domains may be discovered by taking advantage of the commonalities in the C&C protocol shared by different malware samples. Unique traits of a given C&C protocol may be automatically learned from the seed of known C&C communications to derive a control protocol template (CPT), which may in turn be deployed at the edge of a network to detect traffic destined for new C&C domains. For example, a seed of known C&C traffic used to learn the control protocol templates may be generated by leveraging blacklists of known C&C domain names. Adaptive templates that learn from the traffic profile of the network where the templates are to be deployed may also be built. Hybrid templates that can self-tune to each specific deployment scenario may be generated, which may be done to prevent excessive false positives. The templates may model the entire content of HTTP requests, rather than being limited to the URL string. The systems and methods described herein may detect C&C communications initiated by single malware infected machines with low false positive and high true positive rates, and may attribute the discovered new C&C domains to a known malware family name or malware operator (e.g., the name of the cybercriminal group behind the malware operation). Discovered C&C domain names may also be deployed in existing lightweight malware detection systems based on DNS traffic inspection, thus contributing to the detection and attribution of malware infections in very large networks (e.g., ISP networks) where monitoring all traffic may not be practically feasible.

Systems and methods described herein may comprise one or more computers. A computer may be any programmable machine or machines capable of performing arithmetic and/or logical operations. In some embodiments, computers may comprise circuits, integrated circuits, processors, memories, data storage devices, and/or other commonly known or novel components. These components may be connected physically or through network or wireless links. Computers may also comprise software which may direct the operations of the aforementioned components. Computers may be referred to with terms that are commonly used by those of ordinary skill in the relevant arts, such as servers, PCs, mobile devices, routers, switches, data centers, distributed computers, and other terms. Computers may facilitate communications between users and/or other computers, may provide databases, may perform analysis and/or transformation of data, and/or perform other functions. It will be understood by those of ordinary skill that those terms used herein are interchangeable, and any computer capable of performing the described functions may be used. For example, though the term "router" may appear in the following specification, the disclosed embodiments are not limited to routers.

Computers may be linked to one another via a network or networks. A network may be any plurality of completely or partially interconnected computers wherein some or all of the computers are able to communicate with one another. It will be understood by those of ordinary skill that connections between computers may be wired in some cases (e.g., via Ethernet, coaxial, optical, or other wired connection) or may be wireless (e.g., via Wi-Fi, WiMax, or other wireless connection). Connections between computers may use any protocols, including connection oriented protocols such as TCP or connectionless protocols such as UDP. Any connection through which at least two computers may exchange data can be the basis of a network.

Figure 1:
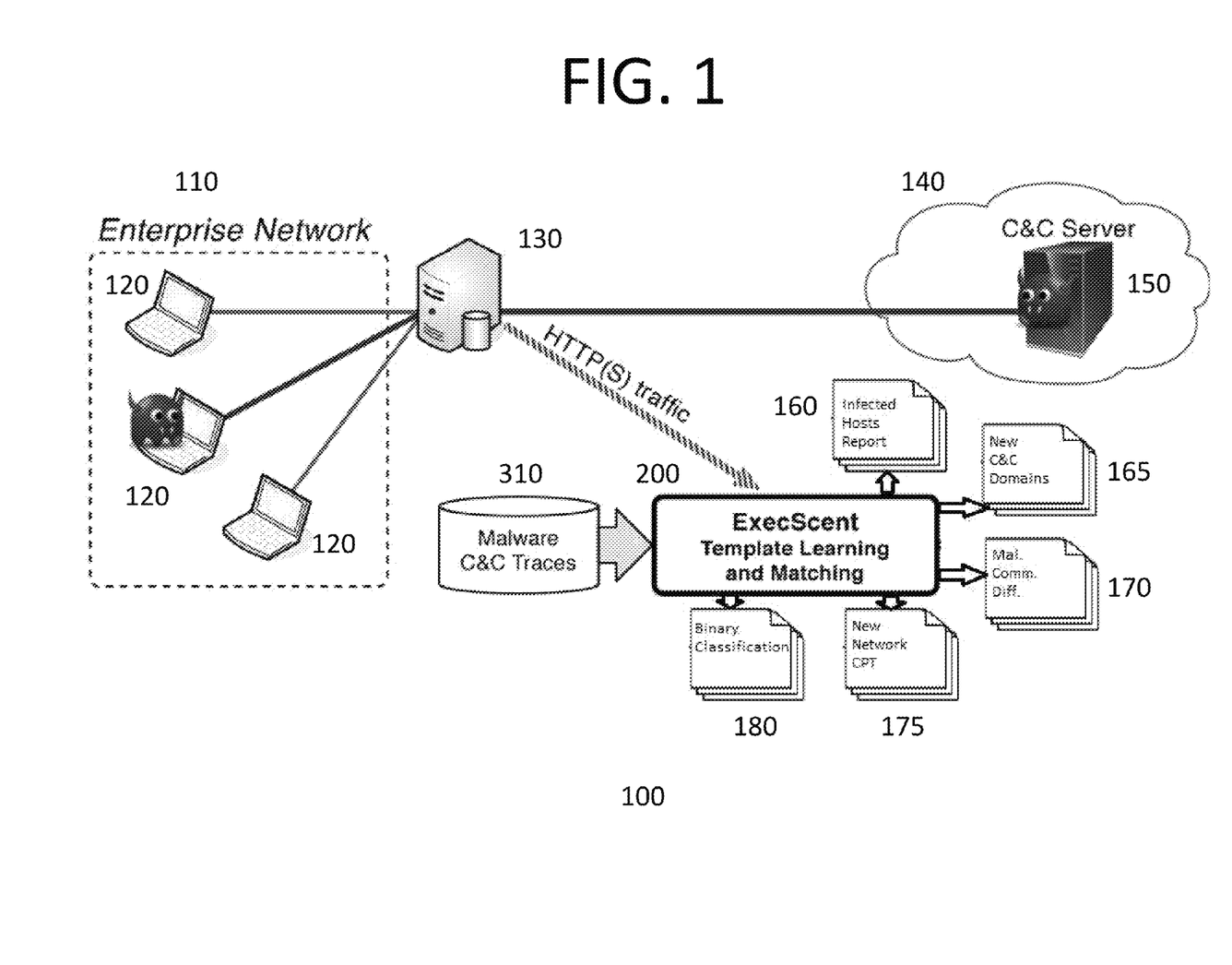
FIG. 1 is a network according to an embodiment of the invention.

FIG. 1 is a network 100 according to an embodiment of the invention. In this example, the network 100 may include an enterprise network 110 (e.g., a local area network) wherein one or more computers 120 may communicate with one another and/or an external public network such as the Internet 140. The computers 120 may be in communication with a server 130 through which Internet traffic and/or other traffic to and from portions of the network 100 outside the enterprise network 110 may flow (e.g., HTTP(S) traffic, as shown). In some cases, one or more external computers in communication with the server 130 may be C&C servers 150 associated with malware C&C domains. As will be described in greater detail below, a traffic classification system 200 may be part of and/or in communication with the server 130 or other computers 120 of the enterprise network 110. The traffic classification system 200 may receive traffic, which may include malware C&C traces 310, and perform template learning and matching operations. The traffic classification system 200 may generate infected hosts reports 160, identify new C&C domains 165, determine malware communication diffs 170, derive new CPTs 175, and/or perform binary classification 180.

Figure 2A:
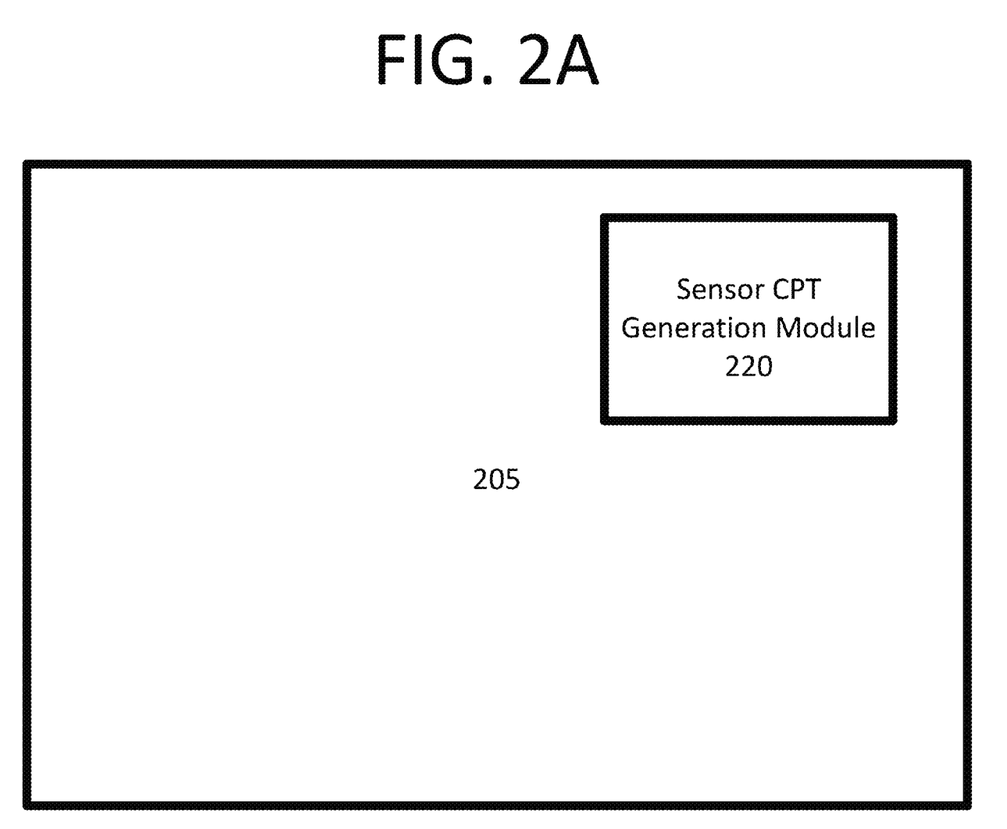
FIG. 2A is a control protocol template (CPT) generation system according to an embodiment of the invention

FIG. 2A is a CPT generation system 205 according to an embodiment of the invention. The CPT generation system 205 may comprise one or more computers and various modules which may perform the tasks described in greater detail below. For example, the traffic classification system 200 may include a sensor CPT generation module 220.

Figure 2B:
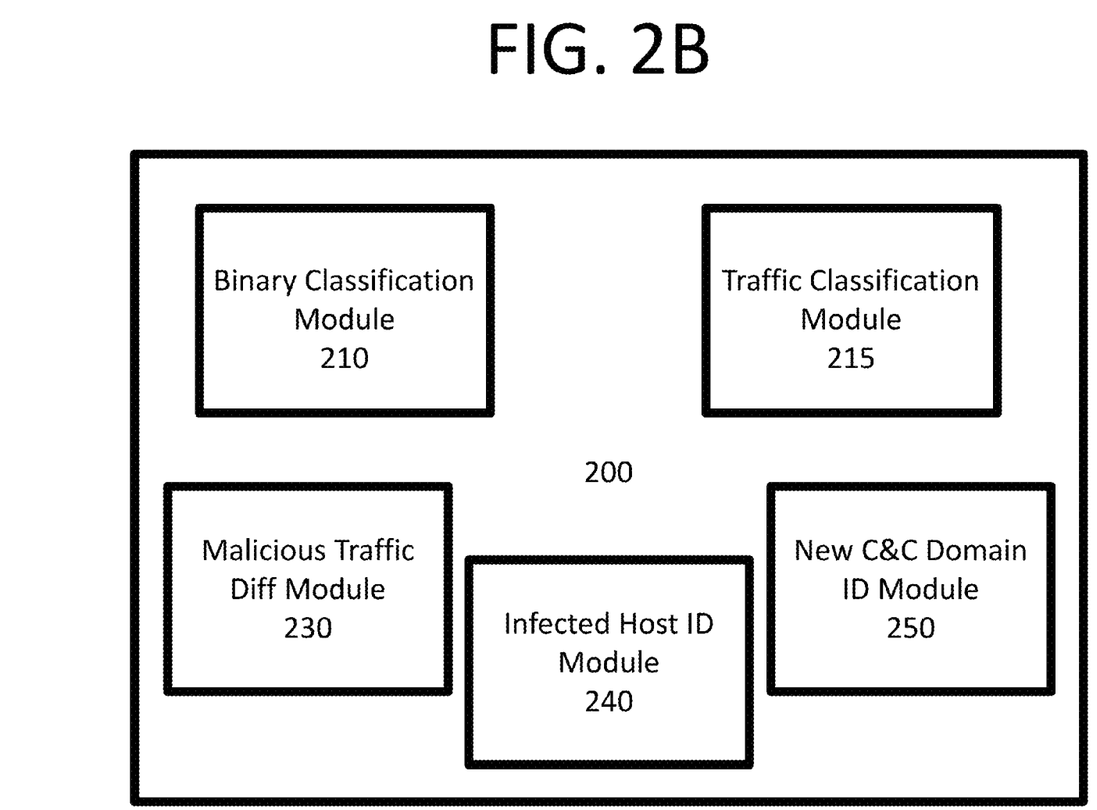
FIG. 2B is a traffic classification system according to an embodiment of the invention.

FIG. 2B is a traffic classification system 200 according to an embodiment of the invention. The traffic classification system 200 may receive CPT data from the CPT generation system 205, for example via a network connection or direct connection. The traffic classification system 200 may comprise one or more computers and various modules which may perform the tasks described in greater detail below. For example, the traffic classification system 200 may include a binary classification module 210, a traffic classification module 215, a malicious traffic difference (diff) module 230, an infected host ID module 240, and/or a new C&C domain ID module 250.

Figure 3:
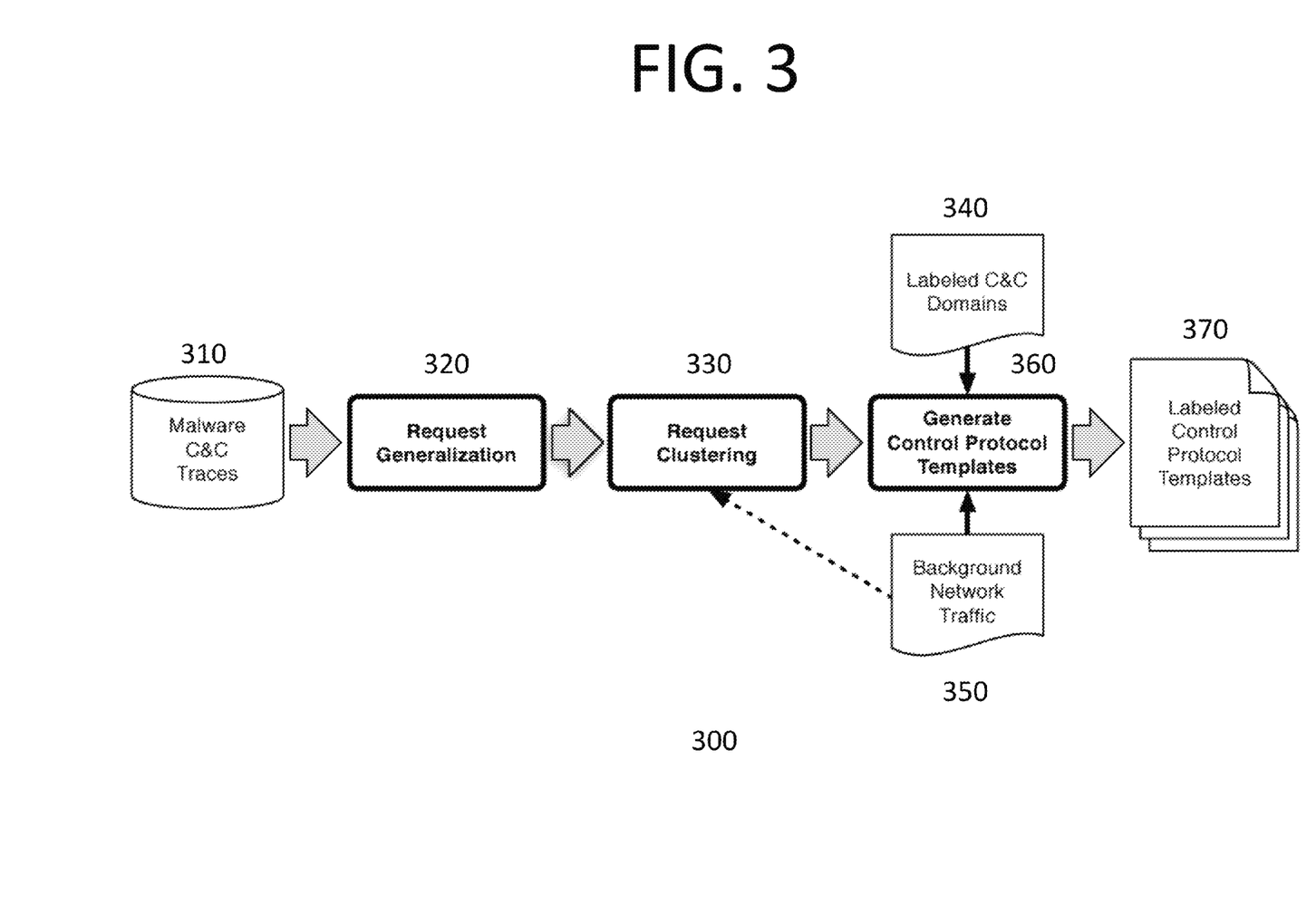
FIG. 3 is a CPT generation process according to an embodiment of the invention.

FIG. 3 is a CPT generation process 300 according to an embodiment of the invention. Given a large repository of malware-generated network traces 310, the CPT generation module 220 may first reconstruct all HTTP requests performed by each malware sample. In 320, the CPT generation module 220 may apply a request generalization process, in which it may replace some of the request parameters (e.g., URL parameter values) with their data type and length. The CPT generation module 220 may consider the entire content of the HTTP requests, not only the URLs, and the generalization process may be applied to different parts of the request header. In 330, the CPT generation module 220 may cluster the generalized requests. Applying the generalization process may improve the accuracy of the request clustering process, in which the CPT generation module 220 may group together malware-generated requests that follow a similar C&C protocol. Once the malware requests have been clustered, in 360 the CPT generation module 220 may apply a template learning process which may derive the CPTs. A CPT may summarize the generalized HTTP requests grouped in a cluster, and may record a number of properties such as the structure of the URLs, the set of request headers, the IP addresses contacted by the malware, etc. Furthermore, in 340 the CPT generation module 220 may use the templates and a database of labeled C&C domains to associate a malware family label to each template, as discussed in greater detail below. Before the templates are deployed in a network, in 350 the CPT generation module 220 may adapt the CPTs to the background traffic observed in that network. For example, for each template component (e.g., the generalized URL path, the user-agent string, the request header set, etc.), the CPT generation module 220 may compute how frequently the component appears in the deployment network. CPT components that are popular in the background traffic may be assigned a lower match confidence for that network. On the other hand, components that appear very infrequently (or not at all) in the traffic may be assigned a higher confidence. These rare components may be defined as components having high specificity with respect to the deployment network's traffic, as discussed in greater detail below. Next, the system 200/205 may deploy the CPT. After deployment, in 370 a HTTP request may be labeled as C&C if it matches a CPT with high similarity and specificity (e.g., if the request closely matches a CPT and the matching CPT components have high specificity (e.g., rarely appear) in that particular deployment network). Note that in some embodiments, some portions of the process 300 may be performed by other modules in addition to and/or in place of the CPT generation module 220, such as, for example the traffic classification module 215.

Figure 4:
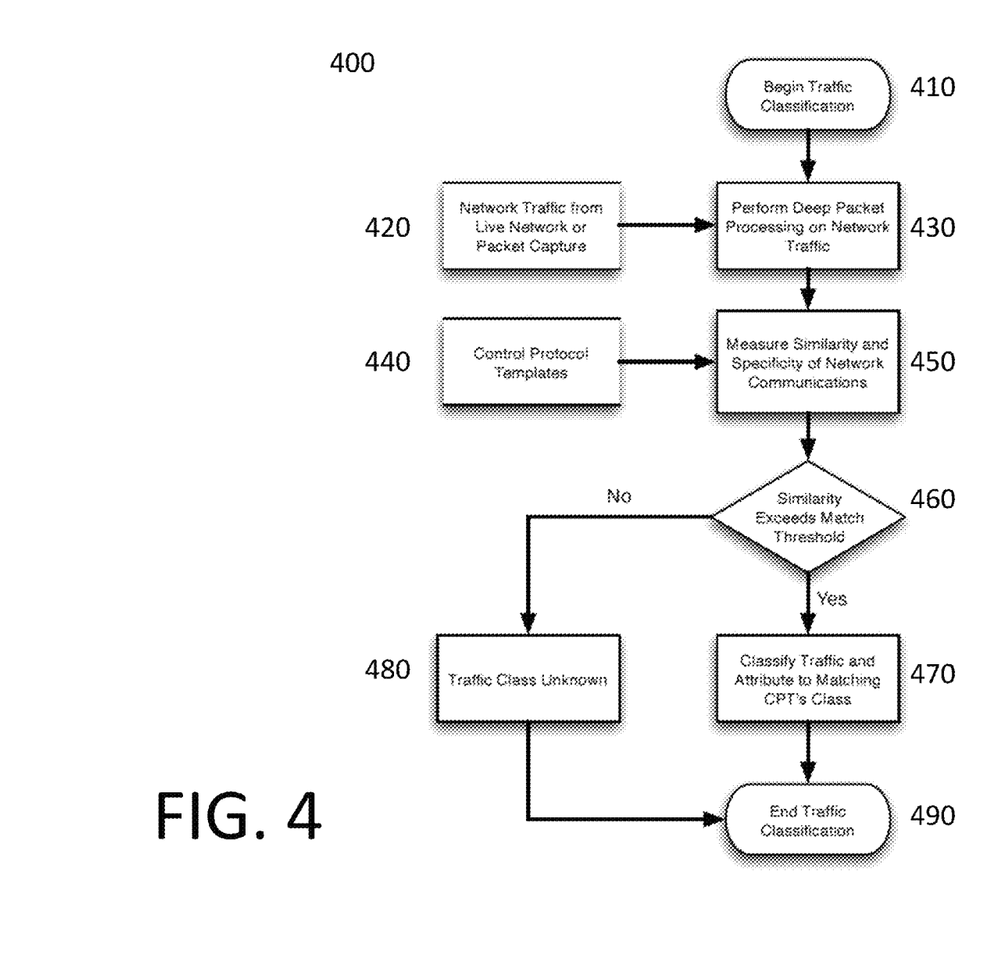
FIG. 4 is a traffic classification process according to an embodiment of the invention.

FIG. 4 is a traffic classification and attribution process 400 according to an embodiment of the invention. In 410, the traffic classification module 215 may begin the classification process 400. Note that this process may be performed after CPTs have been generated. CPT generation is described in greater detail below. In 420, the traffic classification module 215 may receive network traffic from live network monitoring and/or packet capture. In 430, the traffic classification module 215 may perform deep packet processing on the network traffic to determine the properties of the communications for comparison to CPTs. Also note that in some embodiments, deep packet processing may be performed elsewhere, and the results may be used by the traffic classification module 215. In 440, the traffic classification module 215 may receive or access the CPTs. In 450, the traffic classification module 215 may measure the similarity and/or specificity of the monitored and processed network communications in relation to one or more CPTs. The confidence in a match of template in a given network may depend on similarity and/or specificity. Similarity may be defined as a measure of how closely an HTTP request matches an element of the template. Specificity may be defined as a measure of how specific (or rare) are the template components with respect to the network's traffic in general. In 460, the traffic classification module 215 may determine whether the similarity of the traffic exceeds a match threshold for one or more CPTs. If so, in 470 the traffic classification module 215 may classify the traffic and its matching attribute(s) to the matching CPT class(es). If not, in 480 the traffic classification module 215 may determine that the traffic has an unknown class. After classification, in 490 the process 400 may end.

For example, the following hypothetical scenario may illustrate the tailoring of a template to a specific network. Assume a template that matches an HTTP request in both networks NetA and NetB with a similarity score s when compared in 460 as described above. Assume the score s is the same for both NetA's traffic and NetB's traffic. Suppose also that the server's IP (or its /24 prefix) associated with the matching traffic is ipa for NetA and ipb for NetB. Also, suppose that ipa is popular in network NetA, whereas ipb has very low popularity in NetB because it has never been contacted by hosts in that network. Because ipa is very popular in NetA (e.g., more than 50% of the hosts in NetA have contacted the domain in the past), it may be likely that the template is matching benign traffic, thus potentially causing a large number of false positives in NetA. On the other hand, because ipb has very low popularity in NetB, it is more likely that the match is a true detection, or that in any case will generate very few (potentially only one) false positives in NetB. Consequently, as set forth above in 470, based on a model of recent traffic observed in NetA and NetB, confidence for the matches observed in NetA may be lowered, but may not be lowered for NetB. In other words, the system may to NetA to "tune down" the false positives. At the same time, keeping the confidence in high for NetB means that the system may still be able to detect C&C communications that match while keeping the risk of false positives low. This approach may be generalized to all other components of the templates (e.g, the structure of the URLs, the user-agent strings, the other request headers, etc.), in addition to the destination IPs. An HTTP request may be labeled as C&C if it matches a CPT with both high similarity and high specificity. Considering more than just URLs may enable detection of more malware than considering only URLs. For example, some malware (e.g., TDL4) may exchange information with the C&C by first encrypting it, encoding it (e.g., using base-64 encoding), and embedding it in the URL path. In another example, identifier strings may be embedded in fields such as user-agent (e.g., some malware samples use their MD5 hash as user-agent name), encoded in other request headers (e.g., in the referrer), or in the body of POST requests.

Figure 5:
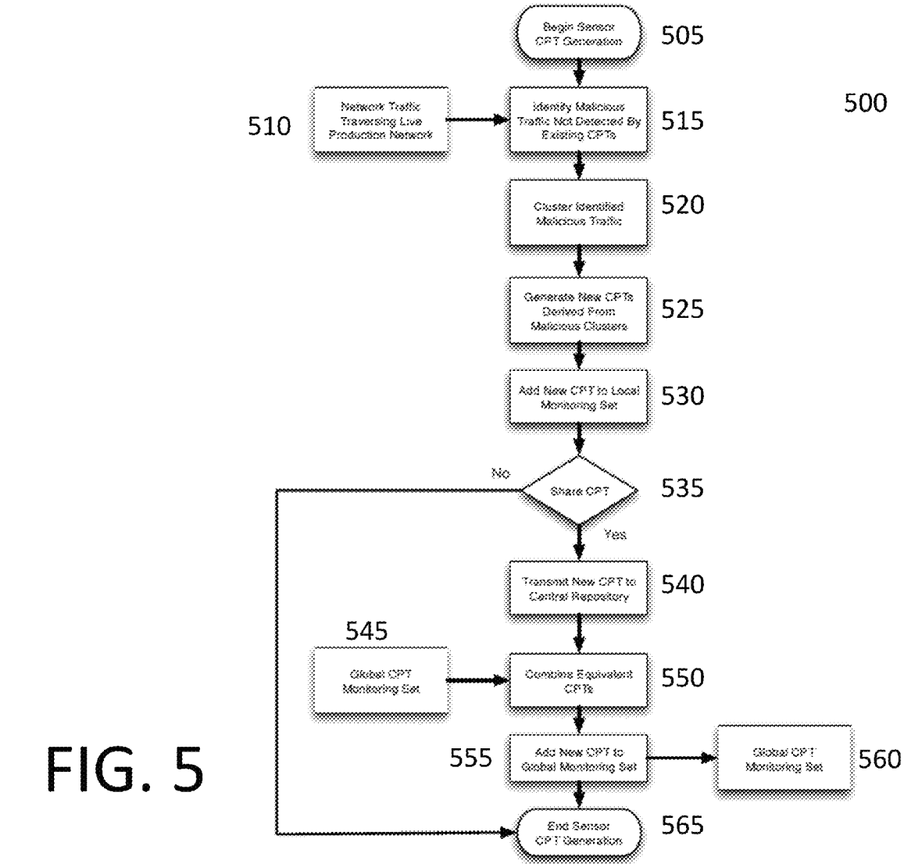
FIG. 5 is a CPT generation process according to an embodiment of the invention.

FIG. 5 is a CPT generation process 500 according to an embodiment of the invention. In 505, the generation process 500 may begin. In 510, the CPT generation module 220 may receive network traffic and in 515 the CPT generation module 220 may identify malicious traffic not detected by existing CPTs, as discussed in greater detail below. In 520, the CPT generation module 220 may cluster identified malicious traffic, and in 525 the CPT generation module 220 may generate new CPTs from the malicious clusters. In 530, the new CPTs may be added to a local monitoring set of CPTs. In 535, a decision may be made to share the new CPTs with other systems 200. If they are not to be shared, in 565 the process may end. If sharing is to be performed, in 540 the CPT generation module 220 may transmit the new CPT to a central repository. In 545, the central repository may retrieve a global CPT monitoring set, and in 550 the new CPT may be combined to an existing CPT if it is equivalent. If there is no existing equivalent CPT, in 555 the new CPT may be added to the new monitoring set, and in 550 the new set may be stored. Then in 565 the process may end. Note that in some embodiments, some portions of the process 500 may be performed by other modules in addition to and/or in place of the CPT generation module 220, for example the traffic classification module 215.

The following is a detailed example of a CPT generation process 500. To obtain CPTs, similar C&C requests may be grouped together. To this end, an appropriate similarity metric may be defined before clustering algorithms can be applied in 520. The system may use a set of heuristics to detect strings that represent data of a certain type, and may replace them accordingly using a placeholder tag containing the data type and string length. For example, "fa45e" may be identified as lowercase hexadecimal because it contains numeric characters and the alphabetic characters are all valid lowercase hexadecimal digits. Example data types which may be identified include integer, hexadecimal (upper, lower and mixed case), base64 (standard and URL safe), and string (upper, lower and mixed case). In addition, for integer, hexadecimal, and string, the system may identify the data type plus additional punctuation such as ":" or "." (e.g., 192.168.1.1 may be identified as a data type of integer+ period of length 11). Furthermore, the system may be extended to support data types such as IP address, MAC address, MD5 hash, and version number.

Similar C&C requests may be grouped together before extracting the templates, as set forth above in 520. This clustering step may assist the automatic CPT generation algorithm, improving efficiency and yielding templates that may be generic enough to match similar C&C communications in new traffic, and precise enough to generate very few or no false positives. C&C request clustering may be performed in two phases. During the first phase, C&C requests may be grouped based on their destination IPs. For example, two C&C requests may be grouped together if their destination IPs reside in /24 (or class C) networks that share a DNS-based relationship. In this example, two /24 networks may be related if there exists at least one domain name which resolved to different IP addresses residing in the two different networks. To find such relationships, a large passive DNS database may be used. In the second phase, one coarse-grained cluster at a time may be evaluated, and a cluster's C&C requests may be finely grouped according to a content similarity function. An agglomerative hierarchical clustering algorithm may be used group together C&C requests within a coarse-grained cluster that carry similar generalized URLs, similar user-agent strings, similar numbers of HTTP header fields and respective values, etc. When measuring the similarity between two requests, both the similarity and specificity of the requests' content may be considered, where the specificity (or low "popularity") may be measured with respect to a dataset of traffic recently collected from different networks.

Once C&C requests have been clustered, a CPT may be generated from each cluster, as set forth above in 525. At this stage, only clusters that contain at least one HTTP request to a known C&C domain may be considered. Each template may represent a summary of all C&C requests in a cluster, and may contain the following components:

Median URL path: median path string that minimizes the sum of edit distances from all URL paths in the requests.

URL query component: stores the set of parameter names and value types and lengths observed in the query component of each of the URLs.

User-agent: the set of all different (generalized) user agent strings found in the requests.

Other headers: the set of other HTTP headers observed in the requests and responses. For each header, the length and value string may also be stored.

Dst. networks: the set of all destination /24 networks associated with the C&C requests in the cluster.

Request Content: the set of data-types, encodings and lengths for the content found in the requests.

Response Content: the set of data-types, encodings and lengths for the content found in the responses.

Malware family: the (set of) malware family name(s) associated to the known C&C requests in the cluster.

In addition, each CPT may include the following deployment related information:

URL regex: to increase the efficiency of the template matching phase, each template includes a regular expression automatically generated from the set of URL strings in the requests. The URL regex may be built to be fairly generic, and is used during deployment to filter out traffic that is unlikely to closely match the entire template, thus reducing the cost of computing the similarity between HTTP requests in live traffic and the template.

Background traffic profile: information derived from the traffic observed in the deployment environment within the past W days (where W is a system parameter). This is used for computing the specificity of the CPT components, thus allowing to adapt the CPT to the deployment network.

Once the CPTs are deployed, the traffic classification process 400 may label an HTTP request as C&C if it matches a CPT with both high similarity and specificity, as set forth above in 450. To this end, a specificity score may be computed for each element of a component, which indicates how "unpopular" that element is with respect to the traffic profile in the deployment network. Computing URL specificity may rely on a supervised classification approach. For example, given a dataset of traffic collected from a large network, all URLs may be extracted. A map of URL word frequencies may be generated, where the "words" are extracted by tokenizing the URLs (e.g., extracting elements of the URL path, filename, query string, etc.). Then, if there is a new URL, it may be translated into a feature vector in which the statistical features measure things such as the average frequency of single "words" in the tokenized URL, the average frequency of word bigrams, the average frequency of the query parameters, the frequency of the file name, etc. (to extract the frequency values for each word found in the URL, previously learned maps of word frequencies may be looked up).

After a large set of "background traffic URLs" has been translated into feature vectors, an SVM classifier that can label new URLs as either popular or unpopular may be trained. First, the "background URLs" may be ranked according to their domain based popularity (i.e., URLs that appear on requests to multiple sites on different domain names may be considered more popular). Then, a sample of URLs may be obtained from the top and from the bottom of this ranking, which may be labeled as popular and unpopular, respectively. This labeled dataset may be used to train the SVM classifier, and the max margin approach used by the SVM may produce a model that can generalize to URLs not seen during training. The trained classifier may then be used in the traffic classification process 400 (e.g., to measure specificity in 450).

During the operational phase (once the SVM classifier is trained and deployed), a URL may be translated into its corresponding feature vector, which may be fed to the SVM classifier. The classifier can then label the URL as either popular or unpopular. In some embodiments, only the classification score (or confidence) associated with the popular class may be considered. Therefore, the SVM's output can be interpreted as follows: the higher the score, the more the URL "looks like" a popular URL, when compared to the large set of URLs observed in the background traffic. Finally a specificity score for the URL may be computed.

Template matching, as set forth in 450, may be performed in two phases. Each template may contain an URL regular expression automatically derived from the C&C requests in a cluster. An HTTP request may be tested for template matching by comparing its URL to the template's URL regex. As noted above, the URL regex may be intentionally built to be fairly generic, and may be used to efficiently filter out traffic that is very unlikely to match the entire template. Furthermore, the destination IP may be checked to determine whether it resides within any of the /24 prefixes in the template. If neither the URL regex nor the destination IP have a match, the HTTP request may be assumed to not match. Otherwise, the entire content of the request may be considered, including transforming the request according to the request generalization process and measuring the overall matching score between the generalized request and the template.

Similarity between data being analyzed, such as an HTTP request, and a CPT may be determined as follows: To determine if a new HTTP request r matches a CPT, a matching score may be computed using a similarity function that compares each element of a request with its respective counterpart in a template using a dynamic weighting function. The dynamic weighting function may be a function of both the similarity and the specificity of the component of the CPT. For example, given an HTTP request r and a CPT t, a matching score $S(r,t)$ may be determined according to Equation 1: $S(r,t)=(\Sigma_k \omega_k(s_k,\sigma_k)*s_k(r_k,t_k))/(\Sigma_k \omega_k(s_k,\sigma_k))*\sigma_d$, where $s_k$ is a similarity function that compares each element $t_k$ of t with its respective counterpart $r_k$ of r, and where $\omega_k$ is a dynamic weight that is a function of both the similarity $s_k$ and the specificity $\sigma_k$ of the k-th component of t. The denominator may scale $S(r,t)$ between zero and one.

The factor $\sigma_d$ may be the specificity of the destination domain d of request r, which may be computed as $\sigma_d=1-(m_d/(\max_i\{m_{di}\}))$ where $m_d$ is the number of hosts in the deployment network's traffic that queried domain d and $\max_i\{m_{di}\}$ is the number of hosts that queried the most popular domain in the traffic. Accordingly, $\sigma_d$ may be used to decrease the matching score $S(r,t)$ for low-specificity domains (i.e., domains queried by a large number of hosts), because infections of a specific malware family may affect a relatively limited fraction of all hosts in an enterprise network, as modern malware may propagate relatively "slowly" via drive-by downloads or social engineering attacks. In turn, it may be unlikely that a new C&C domain will be queried by a very large fraction (e.g., >50%) of all hosts in the monitored network within a limited amount of time (e.g., one day).

The details of the similarity functions $s_k(\ )$ used in Equation 1, and the selections of their specificity values, may be as follows. In addition, we further $s_1$—Given the path of the URL associated to r, the normalized edit distance between the path and the CPT's median URL path $t_1$ may be measured. The URL path specificity $\sigma_1$ may be computed as discussed above.

$s_{2a}$—A Jaccard similarity between the set of parameter names in the URL query-string of r and the set of names in $t_2$ may be measured. The specificity of the parameter names $\sigma_{2a}$ may be equal to $\sigma_2$.

$s_{2b}$—The data types and lengths of the values in the generalized URL query-string parameters may be compared. For each element of the query string, a score of one may be assigned if its data type in r matches the data type recorded in $t_2$. Furthermore, the ratio between the value length in r and in $t_2$ may be computed. Finally, $s_{2b}$ may be computed by averaging all these scores, wherein the more data types and lengths that match, the higher the similarity score. As in $s_{2a}$, $\sigma_{2b}$ may be equal to $\sigma_2$.

$s_3$—The normalized edit distance between the (generalized) user-agent string in r and each of the strings in the set $t_3$ may be computed. Let $d_m$ be the smallest of such distances, where m is the closets of the template's user-agent strings. Define $s_3=1-d_m$ and set the specificity $\sigma_3=\sigma_{3;m}$.

$s_4$—Given the remaining request header fields in r, the similarity may be measured from different perspectives. First, a Jaccard similarity j between the set of headers in r and the set $t_4$ may be computed. Furthermore, the order of the headers as they appear in r and in the requests from which t was derived may be considered. If the order matches, a variable $o=1$ may be set, otherwise $o=0$. Finally, for each header, the ratio between the length of its value as it appears in r and in $t_5$, respectively, may be compared. The similarity $s_4$ may be defined as the average of all these partial similarity scores (i.e., of j, o, and the length ratios). The specificity score may be set as $\sigma_5=\min_i\{\sigma_{5,hdi}\}$ where the hdl are the request headers.

s5—Let p be the destination IP of request r. If p resides within any of the /24 network prefixes in $t_5$, $s_5=1$, otherwise $s_5=0$. Assume p is within prefix $net_5$ (in which case $s_5=1$). In this case, the specificity may be set as $\sigma_5=\sigma_{5,n}$.

The dynamic weights $w_k(\ )$ may be computed according to Equation 2: $\omega_k(s_k,\sigma_k)=\acute{\omega}_k(1+(1/(2-s_k*\sigma_k)^n))$, where $\acute{\omega}_k$ is a static weight (i.e., it takes a fixed value), and n is a configuration parameter. Notice that $\omega_k \in (\acute{\omega}_k(1+1/2^n),2\acute{\omega}_k)$, and that these weights are effectively normalized by the denominator of Equation 1, thus resulting in $S(r,t) \in [0,1]$.

The dynamic weights may be used to give higher weight to components of a request r that match their respective counterpart in a CPT with both high similarity and high specificity. In fact, the weight may be maximum when both the similarity and specificity are equal to one, and may tend to the minimum when either the similarity or specificity (or both) tend to zero.

Figure 6:
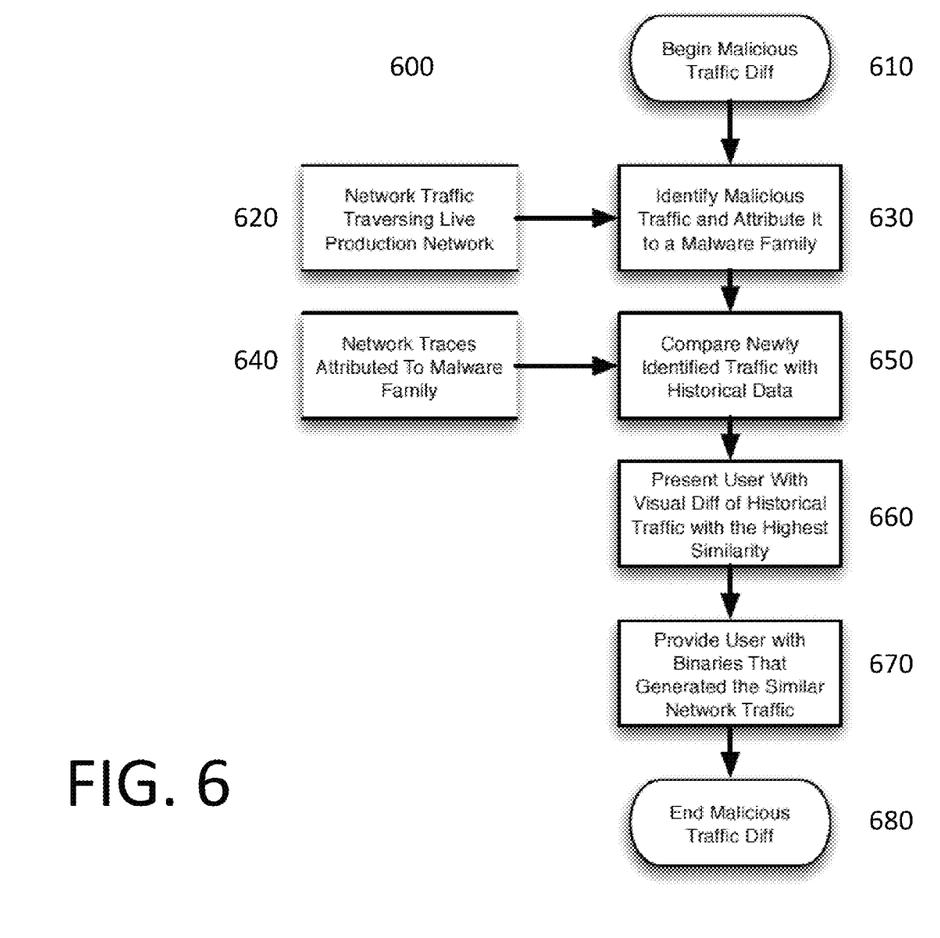
FIG. 6 is a traffic comparison process according to an embodiment of the invention.

FIG. 6 is a traffic comparison process 600 according to an embodiment of the invention. This process 600 may be used to provide a user with a report about identified malicious traffic. In 610, the process 600 may begin. In 620, the malicious traffic diff module 230 may receive network traffic, and in 630 the malicious traffic diff module 230 may identify malicious traffic within the network traffic and attribute it to a malware family as described above. Note that in some embodiments, the malicious traffic diff module 230 may receive this attribution from other modules (e.g., the traffic classification module 215). In 640, the malicious traffic diff module 230 may receive network traces attributed to the malware family, and in 650 the malicious traffic diff module 230 may compare the newly identified traffic with historical malware data. In 660, the malicious traffic diff module 230 may generate a visual diff report and present it to a user. This diff may include a visual representation of historical traffic with high similarity to the recently identified traffic and may be displayed via a computer display for example. In 670, the malicious traffic diff module 230 may provide the binaries that generated the similar network traffic to the user. The user may be able to use this information to identify and/or analyze network threats. In 680, the process may end. Note that in some embodiments, some portions of the process 600 may be performed by other modules in addition to and/or in place of the malicious traffic diff module 230, for example the traffic classification module 215.

Figure 7:
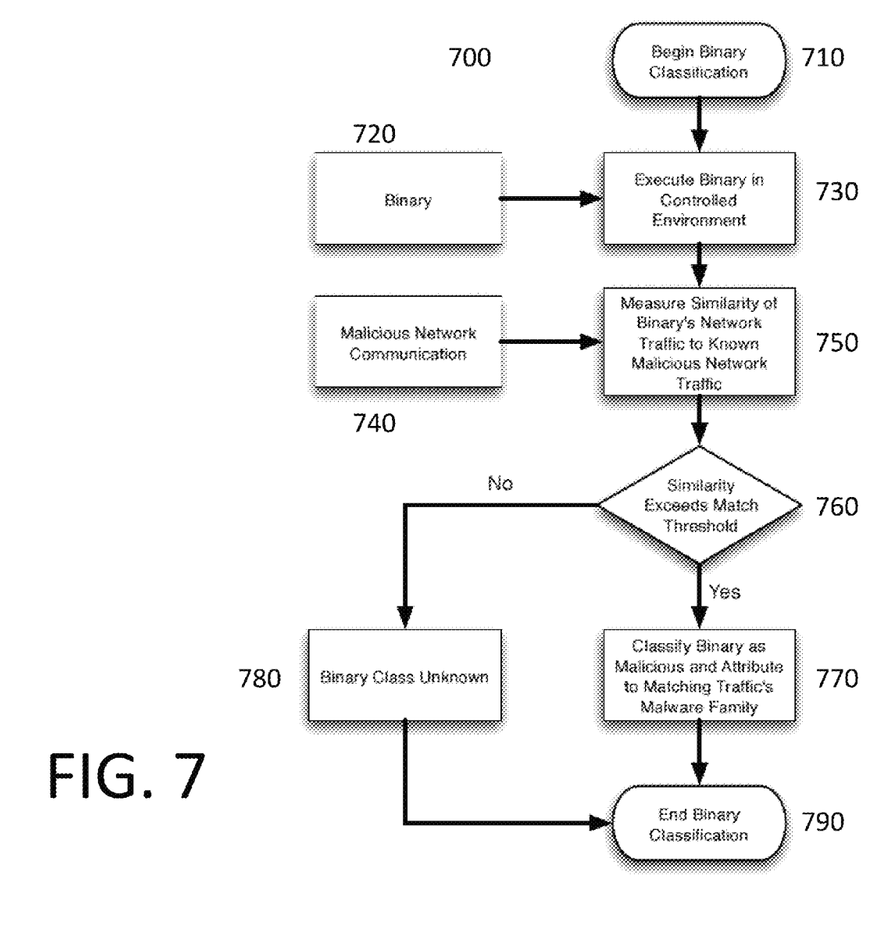
FIG. 7 is a binary classification process according to an embodiment of the invention.

FIG. 7 is a binary classification process 700 according to an embodiment of the invention. In 710, the binary classification module 210 may begin the binary classification process 700. Note that this process may be performed after CPTs have been generated as described above. In 720, the binary classification module 210 may receive a binary to be analyzed. In 730, the binary classification module 210 may execute the binary in a controlled environment to determine its behavior. In 740, the binary classification module 210 may receive or access known malicious network communication, which may be part of a CPT for example. In 750, the binary classification module 210 may measure the similarity of the binary's network traffic from the controlled execution to the known malicious traffic. In 760, the binary classification module 210 may determine whether the similarity of the traffic exceeds a match threshold. If so, in 770 the binary classification module 210 may classify the binary as malicious and attribute it to the family of the matching known malicious malware traffic. If not, in 780 the binary classification module 210 may determine that the binary has an unknown class. After classification, in 790 the process 400 may end. Note that in some embodiments, some portions of the process 700 may be performed by other modules in addition to and/or in place of the binary classification module 210, for example the traffic classification module 215.

Figure 8:
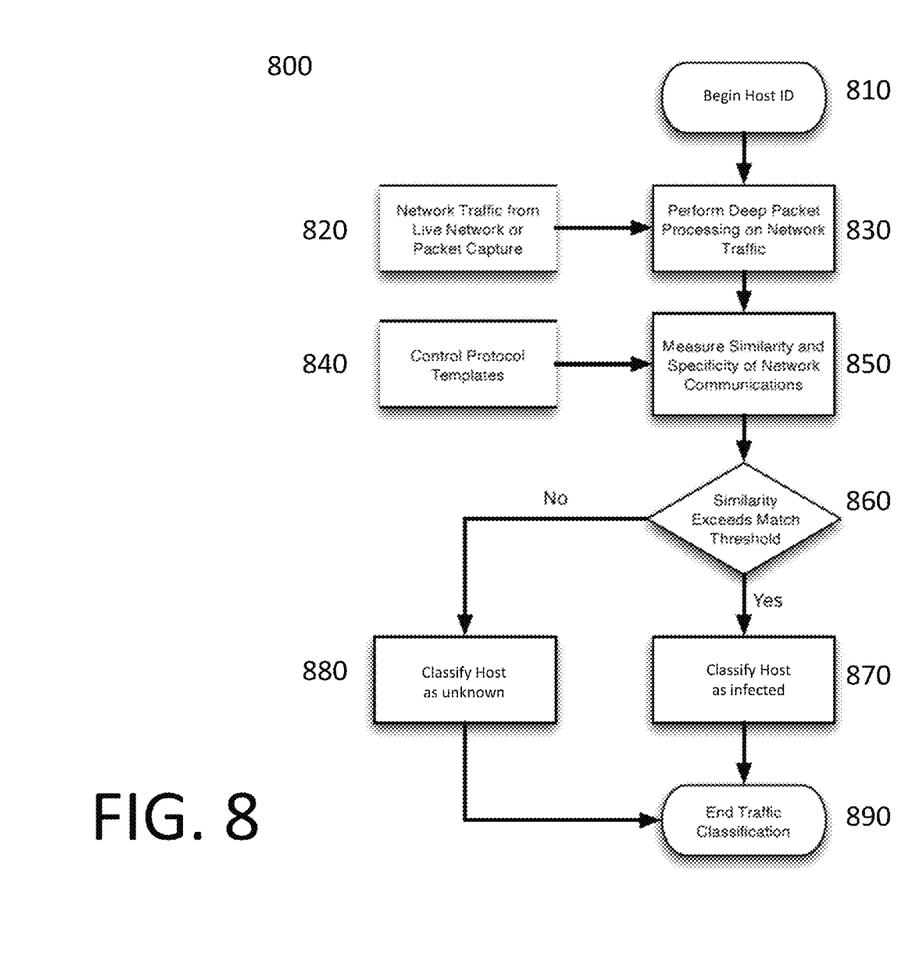
FIG. 8 is a host identification process according to an embodiment of the invention.

FIG. 8 is a host identification process 800 according to an embodiment of the invention. In 810, the infected host identification module 240 may begin the identification process 800. Note that this process may be performed after CPTs have been generated. CPT generation is described in greater detail above. In 820, the infected host identification module 240 may receive network traffic from live network monitoring and/or packet capture. In 830, the infected host identification module 240 may perform deep packet processing on the network traffic to determine the properties of the communications for comparison to CPTs. For example, the identified properties may include host identity (e.g., IP address), so that hosts may be associated with CPTs as described below. Also note that in some embodiments, deep packet processing may be performed elsewhere, and the results may be used by the infected host identification module 240. In 840, the infected host identification module 240 may receive or access the CPTs. In 850, the infected host identification module 240 may measure the similarity and specificity of the monitored and processed network communications in relation to one or more CPTs. In 860, the infected host identification module 240 may determine whether the similarity of the traffic exceeds a match threshold for one or more CPTs. If so, in 870 the infected host identification module 240 may classify the host as infected and associate it with the matching CPT malware family(ies). If not, in 880 the infected host identification module 240 may determine that the host has an unknown class. After classification, in 890 the process 800 may end. Note that in some embodiments, some portions of the process 800 may be performed by other modules in addition to and/or in place of the infected host identification module 240, for example the traffic classification module 215.

Figure 9:
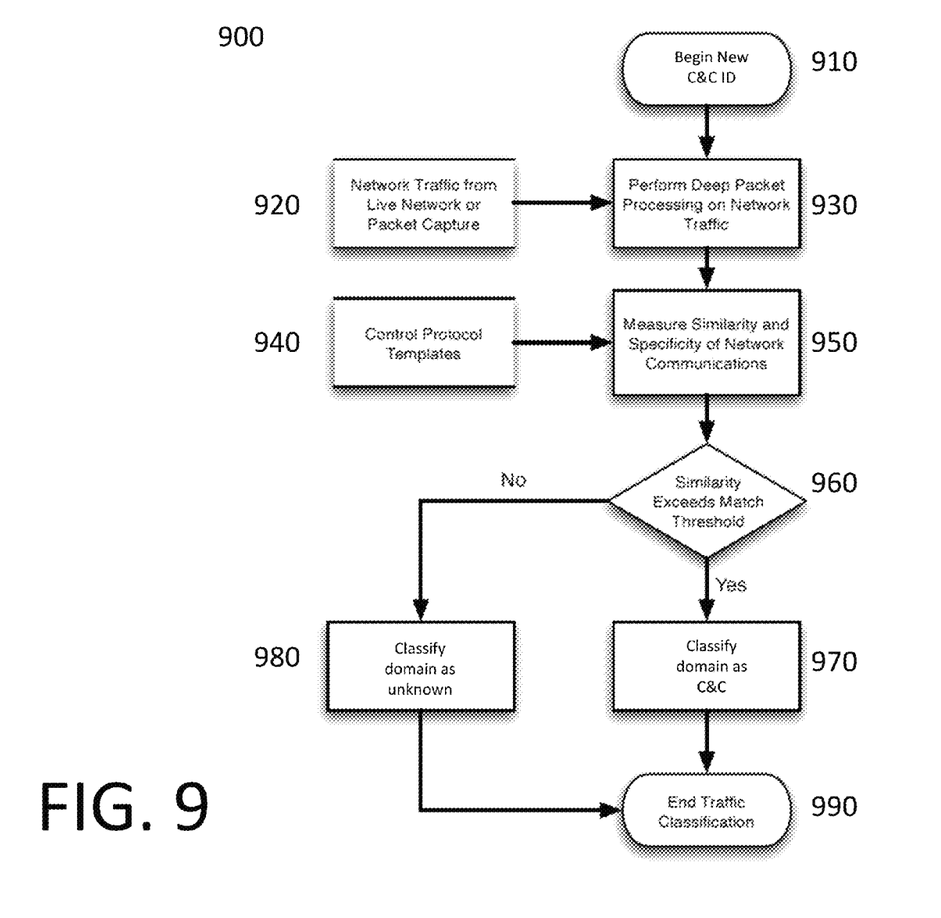
FIG. 9 is a protocol identification process according to an embodiment of the invention.

FIG. 9 is a C&C protocol identification process 900 according to an embodiment of the invention. In 910, the C&C domain identification module 250 may begin the identification process 900. Note that this process may be performed after CPTs have been generated. CPT generation is described in greater detail above. In 920, the C&C domain identification module 250 may receive network traffic from live network monitoring and/or packet capture. In 930, the C&C domain identification module 250 may perform deep packet processing on the network traffic to determine the properties of the communications for comparison to CPTs. Also note that in some embodiments, deep packet processing may be performed elsewhere, and the results may be used by the C&C domain identification module 250. In 940, the C&C domain identification module 250 may receive or access the CPTs. In 950, the C&C domain identification module 250 may measure the similarity and specificity of the monitored and processed network communications in relation to one or more CPTs. In 960, the C&C domain identification module 250 may determine whether the similarity of the traffic exceeds a match threshold for one or more CPTs. If so, in 970 the C&C domain identification module 250 may classify the traffic and/or a domain associated with the traffic as C&C traffic/domain and associate it with the matching CPT class(es). For example, the traffic may match the CPTs in such a way that it can be identified as C&C traffic. Thus, a domain associated with the traffic may be labeled as a C&C domain and attributed to the matching CPT malware family(ies). If not, in 980 the C&C domain identification module 250 may determine that the traffic and/or domain has an unknown class. After classification, in 990 the process 900 may end. Note that in some embodiments, some portions of the process 900 may be performed by other modules in addition to and/or in place of the C&C domain identification module 250, for example the traffic classification module 215.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures which highlight the functionality and advantages are presented for example purposes only. The disclosed methodology and system are each sufficiently flexible and configurable such that they may be utilized in ways other than that shown.

Furthermore, although the term "at least one" may often be used in the specification, claims and drawings, the terms "a", "an", "the", "said", etc. also signify "at least one" or "the at least one" in the specification, claims and drawings. Additionally, the terms "including" and "comprising" in the specification, claims and drawings signify "including, but not limited to."

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A method of classifying network traffic comprising:
performing processing associated with monitoring, with a domain identification module in communication with a processor circuit and a network, network traffic;
performing processing associated with comparing, with a traffic classification module in communication with the processor circuit and the domain identification module, Hypertext Transfer Protocol (HTTP) data of the network traffic with a control protocol template (CPT) stored in a database in communication with the domain identification module and the processor circuit;
when a similarity between the HTTP data of the monitored traffic and the CPT exceeds a match threshold, performing processing associated with associating, with the domain identification module, the monitored traffic with the CPT;
when the similarity between the HTTP data of the monitored traffic and the CPT does not exceed the match threshold, performing processing associated with identifying, with the traffic classification module, the monitored traffic as having an unknown classification;
performing processing associated with monitoring, with a CPT generation module in communication with the processor circuit and the network, traffic on the network to identify malicious traffic;
performing processing associated with clustering, with the CPT generation module, identified associated traffic into a cluster including one or more similar network requests;
performing processing associated with generating, with the CPT generation module, a CPT associated with the cluster, the CPT including information allowing a network request similar to the one or more network requests of the cluster to be identified based on the CPT; and
performing processing associated with combining, with the CPT generation module, the CPT with a second CPT associated with a second cluster of one or more network requests similar to the network requests associated with the CPT.

2. The method of claim 1, wherein:
performing processing associated with associating, with the traffic classification module, the monitored traffic with the CPT comprises identifying the monitored traffic as malicious and attributing the monitored traffic to a malware family associated with the CPT; and
the CPT comprises malicious traffic data associated with the malware family and previously observed network traffic data.

3. The method of claim 2, wherein:
performing processing associated with comparing, with the traffic classification module, the HTTP data of the network traffic with the CPT comprises comparing the HTTP data of the network traffic with a plurality of CPTs, wherein each of the plurality of CPTs comprises a different set of malicious traffic data; and
performing processing associated with attributing, with the traffic classification module, the network traffic to a malware family associated with the CPT comprises attributing the network traffic to at least one malware family associated with at least one of the CPTs.

4. The method of claim 2, further comprising:
performing processing associated with executing, with a binary classification module in communication with the processor circuit, the network, and the traffic classification module, a binary in a controlled environment and monitoring network traffic associated with the binary;
performing processing associated with comparing, with the binary classification module, the HTTP data of the network traffic associated with the binary to the CPT;
when a similarity between the HTTP data of the network traffic associated with the binary and the CPT exceeds a match threshold, performing processing associated with classifying, with the binary classification module, the binary as malicious and attributing the binary to a malware family associated with the CPT; and
when the similarity between the HTTP data of the network traffic associated with the binary and CPT does not exceed the match threshold, performing processing associated with classifying, with the binary classification module, the binary as having an unknown maliciousness.

5. The method of claim 1, further comprising:
performing processing associated with adding, with the CPT generation module, the CPT to the database.

6. The method of claim 1, further comprising:
performing processing associated with distributing, with the CPT generation module, the CPT to a remote computer in communication with the CPT generation module and the processor circuit via the network.

7. The method of claim 2, further comprising:
performing processing associated with identifying, with an infected host identification module in communication with the processor circuit, a host which transmitted the monitored traffic and labeling the host as infected and/or attributing the host infection to a malware family.

8. The method of claim 2, wherein:
performing processing associated with identifying, with the domain identification module in communication with the processor circuit, a domain associated with the monitored traffic and labeling the domain as malicious and/or attributing the domain to a malware family.

9. A method of comparing network traffic comprising:
performing processing associated with comparing, with a malicious traffic comparison module in communication with a processor circuit and a network, Hypertext Transfer Protocol (HTTP) data of malicious traffic of interest with HTTP data of historical malicious traffic data;
performing processing associated with generating, with the malicious traffic comparison module, a report comprising the results of the comparison;
performing processing associated with identifying, with the malicious traffic comparison module, a binary associated with the historical malicious traffic data;
performing processing associated with monitoring, with a control protocol template (CPT) generation module in communication with the processor circuit and the network, traffic on the network to identify malicious traffic;
performing processing associated with clustering, with the CPT generation module, identified malicious traffic into a cluster including one or more similar network requests;
performing processing associated with generating, with the CPT generation module, a CPT associated with the cluster, the CPT including information allowing a network request similar to the one or more network requests of the cluster to be identified based on the CPT: and
performing processing associated with combining, with the CPT generation module, the CPT with a second CPT associated with a second cluster of one or more network requests similar to the network requests associated with the CPT.

10. The method of claim 9, wherein the report comprises a visual comparison of known malicious traffic and a portion of the historical malicious traffic data with a highest similarity to the malicious traffic of interest.

11. The method of claim 9, wherein the identified binary is associated with a portion of the historical malicious traffic data with a highest similarity to the malicious traffic of interest.

12. The method of claim 9, further comprising:
performing processing associated with identifying, with the malicious traffic comparison module, a system trace and/or a network trace associated with the binary.

13. The method of claim 9, further comprising:
performing processing associated with monitoring, with a traffic classification module in communication with the processor circuit, the network, and the malicious traffic comparison module, network traffic;
performing processing associated with comparing, with the traffic classification module, HTTP data of the network traffic with a CPT stored in a database in communication with the binary classification module and the processor circuit;
when a similarity between the HTTP data of the monitored traffic and the CPT exceeds a match threshold, performing processing associated with identifying, with the traffic classification module, the monitored traffic as malicious and attributing the monitored traffic to a malware family associated with the CPT; and when the similarity between the HTTP data of the monitored traffic and the CPT does not exceed the match threshold, performing processing associated with identifying, with the traffic classification module, the monitored traffic as having an unknown maliciousness
wherein the CPT comprises malicious traffic data associated with the malware family and previously observed network traffic data.

14. The method of claim 13, wherein:
performing processing associated with comparing, with the traffic classification module, the HTTP data of the network traffic with the CPT comprises comparing the HTTP data of the network traffic with a plurality of CPTs, wherein each of the plurality of CPTs comprises a different set of malicious traffic data; and
performing processing associated with attributing, with the traffic classification module, the network traffic to a malware family associated with the CPT comprises attributing the network traffic to at least one malware family associated with at least one of the CPTs.

15. The method of claim 9, further comprising:
performing processing associated with executing, with a binary classification module in communication with the processor circuit, the network, and the malicious traffic comparison module, a binary in a controlled environment and monitoring network traffic associated with the binary;
performing processing associated with comparing, with the binary classification module, HTTP data of the network traffic associated with the binary to the CPT;
when a similarity between the HTTP data of the network traffic associated with the binary and the CPT exceeds a match threshold, performing processing associated with classifying, with the binary classification module, the binary as malicious and attributing the binary to a malware family associated with the CPT; and
when the similarity between the HTTP data of the network traffic associated with the binary and CPT does not exceed the match threshold, performing processing associated with classifying, with the binary classification module, the binary as having an unknown maliciousness.

16. The method of claim 9, further comprising:
performing processing associated with adding, with the CPT generation module, the CPT to the database.

17. The method of claim 9, further comprising:
performing processing associated with distributing, with the CPT generation module, the CPT to a remote computer in communication with the CPT generation module and the processor circuit via the network.

18. The method of claim 9, wherein:
the previously observed network traffic data comprises data indicating a frequency for each of a plurality of network traffic types; and
the match threshold is based on the frequencies, wherein a match threshold associated with one of the plurality of network traffic types having a relatively high frequency is higher than a match threshold associated with one of the plurality of network traffic types having a relatively low frequency.

19. The method of claim 1, wherein the similarity comprises a measure of how closely the HTTP data of the measured traffic matches at least one element of the CPT.

* * * * *